Figure 1:
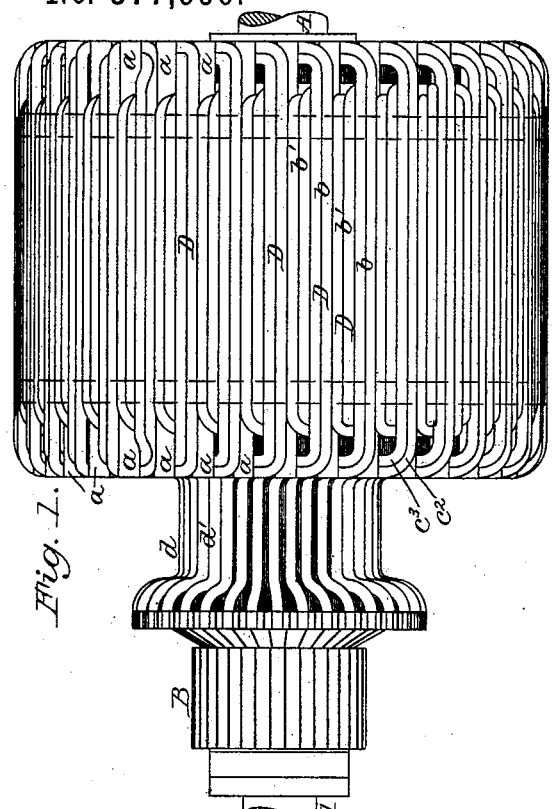

(No Model.) 6 Sheets—Sheet 1.
R. EICKEMEYER.
DYNAMO ELECTRIC MACHINE.

No. 377,996. Patented Feb. 14, 1888.

Attest:
Philip F. Larner
Lowell Bartlett

Inventor:
Rudolf Eickemeyer
By M.C. Wood
Attorney

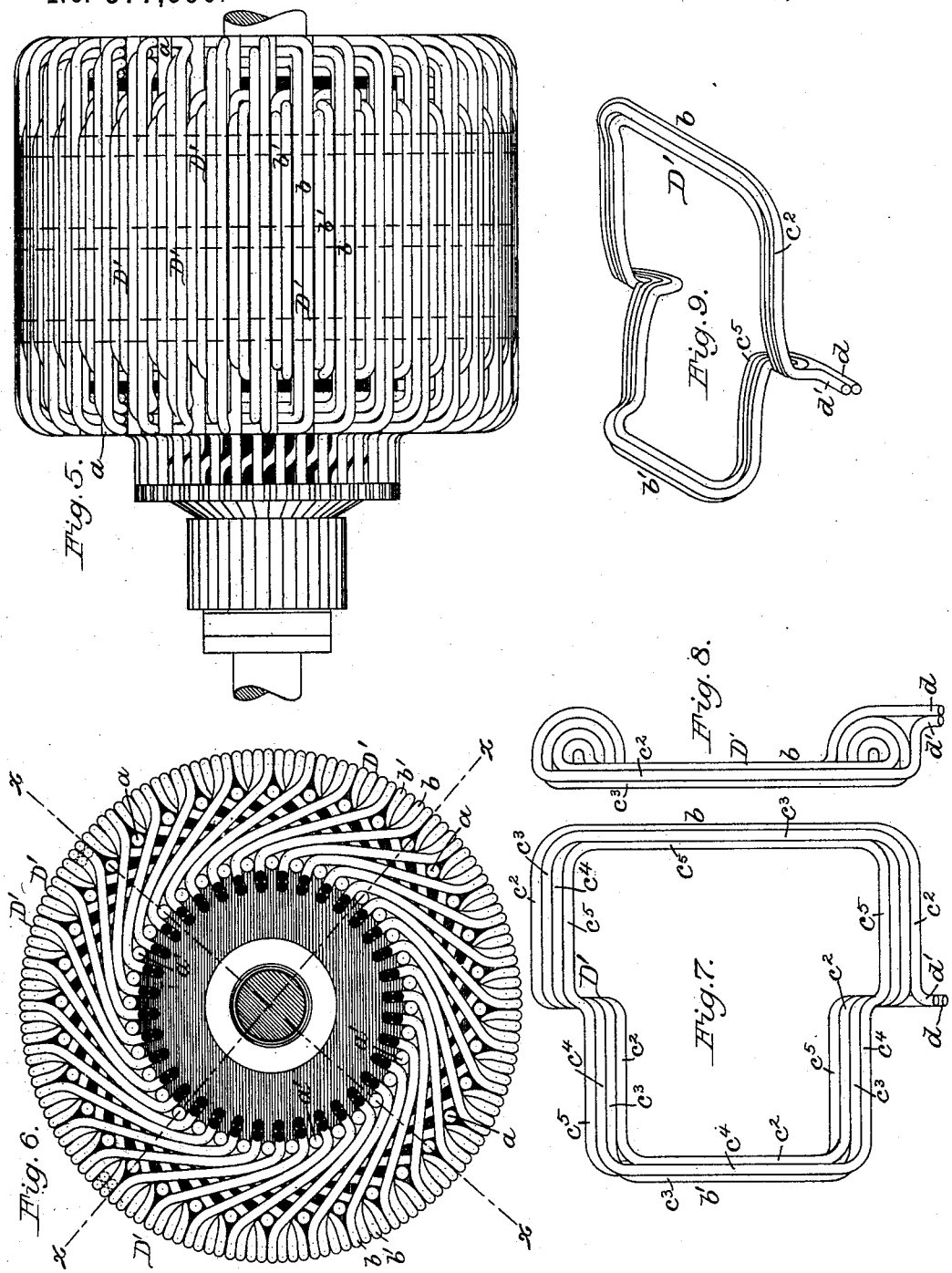

(No Model.)  6 Sheets—Sheet 3.
R. EICKEMEYER.
DYNAMO ELECTRIC MACHINE.
No. 377,996.  Patented Feb. 14, 1888.
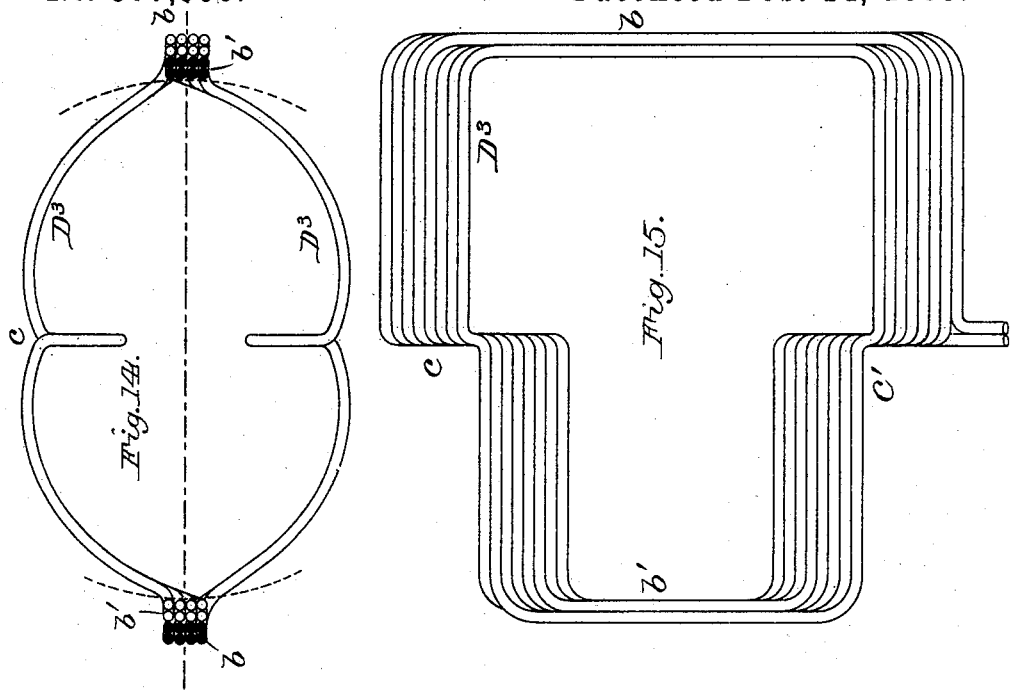
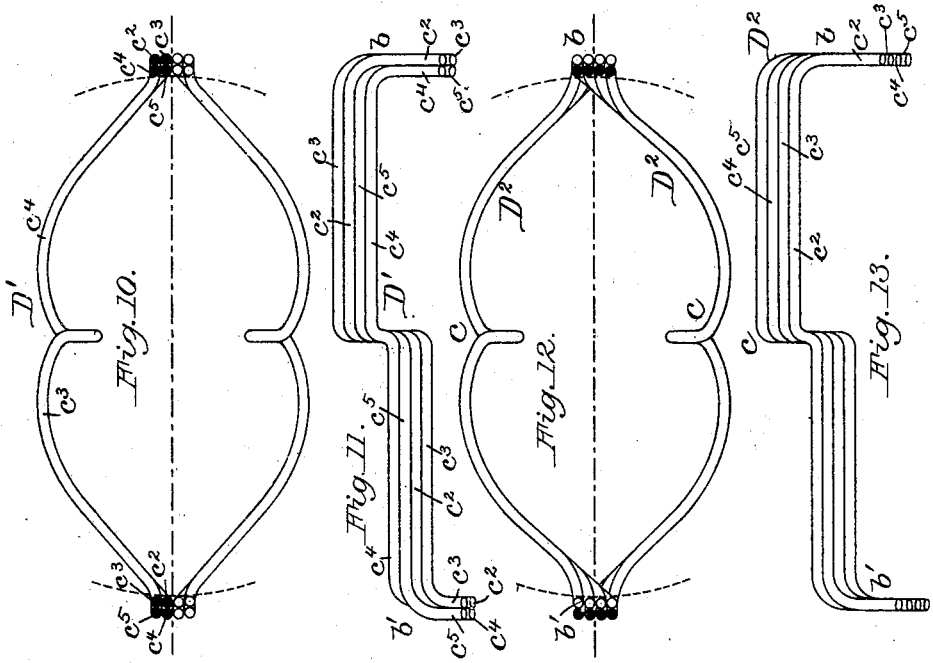
Attest:
Philip F. Larner
Lowell Bartle
Inventor:
Rudolf Eickemeyer
By
Attorney (No Model.) 6 Sheets—Sheet 4.
R. EICKEMEYER.
DYNAMO ELECTRIC MACHINE.
No. 377,996. Patented Feb. 14, 1888.
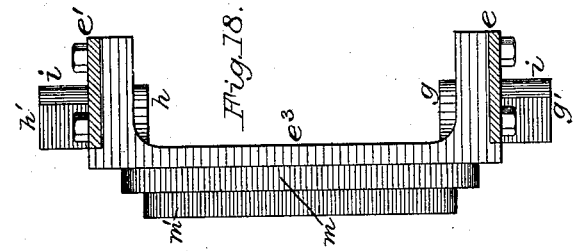
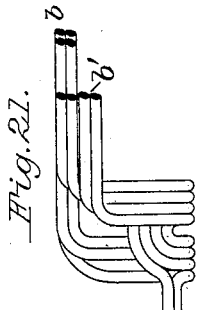
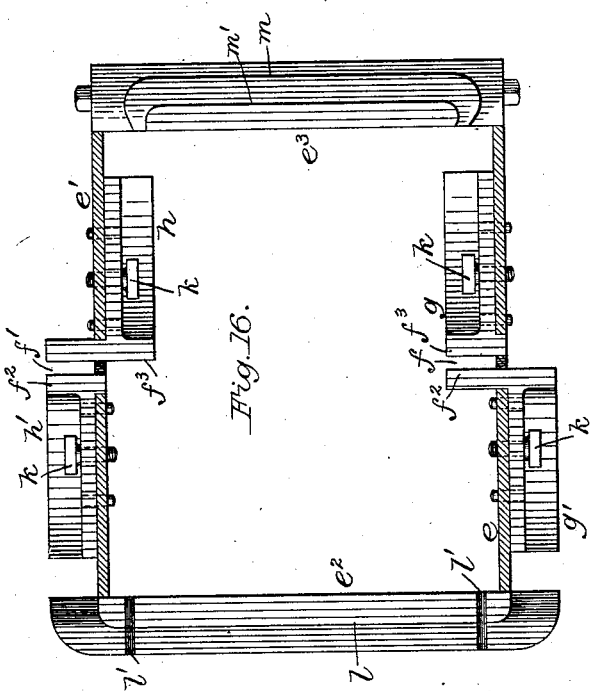
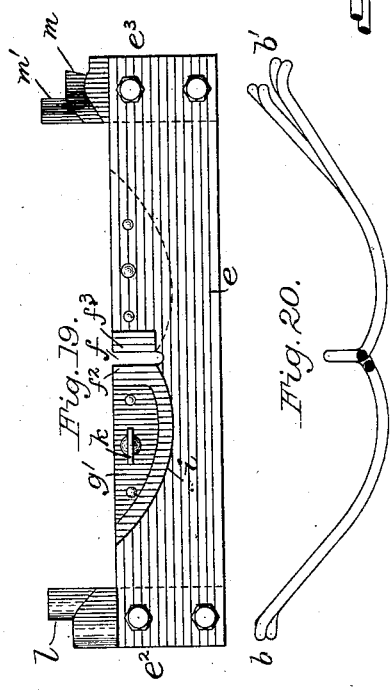
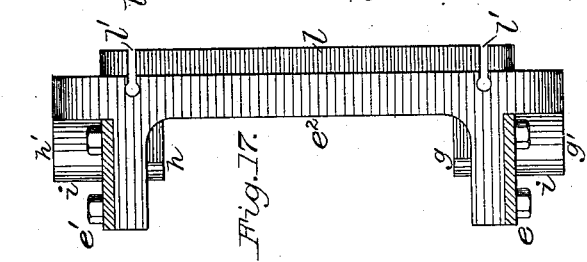
Attest:
Philip F. Larner
Howell Bartle
Inventor:
Rudolf Eickemeyer
By Wm E Mord
Attorney.

(No Model.) 6 Sheets—Sheet 5.
R. EICKEMEYER.
DYNAMO ELECTRIC MACHINE.
No. 377,996. Patented Feb. 14, 1888.
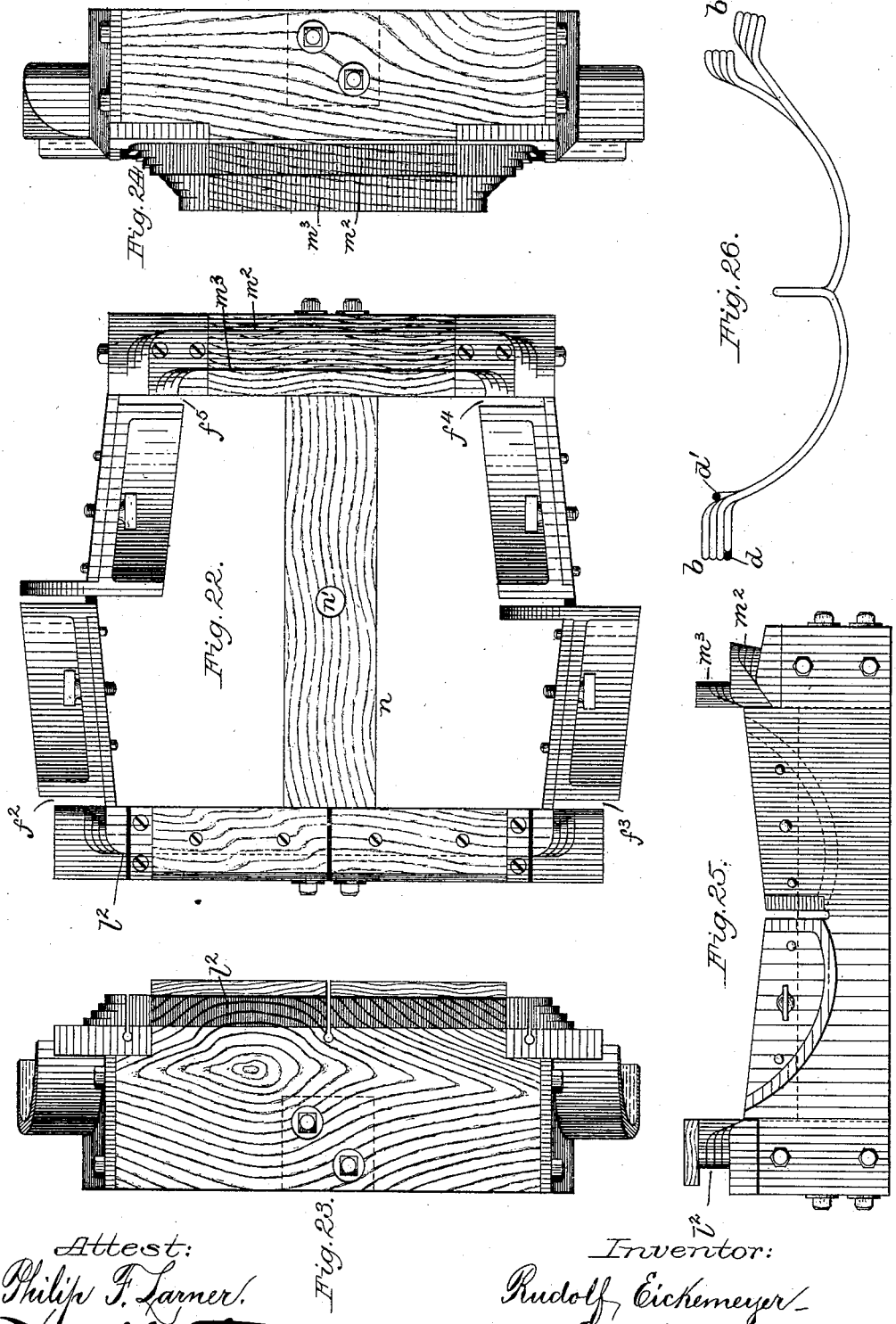

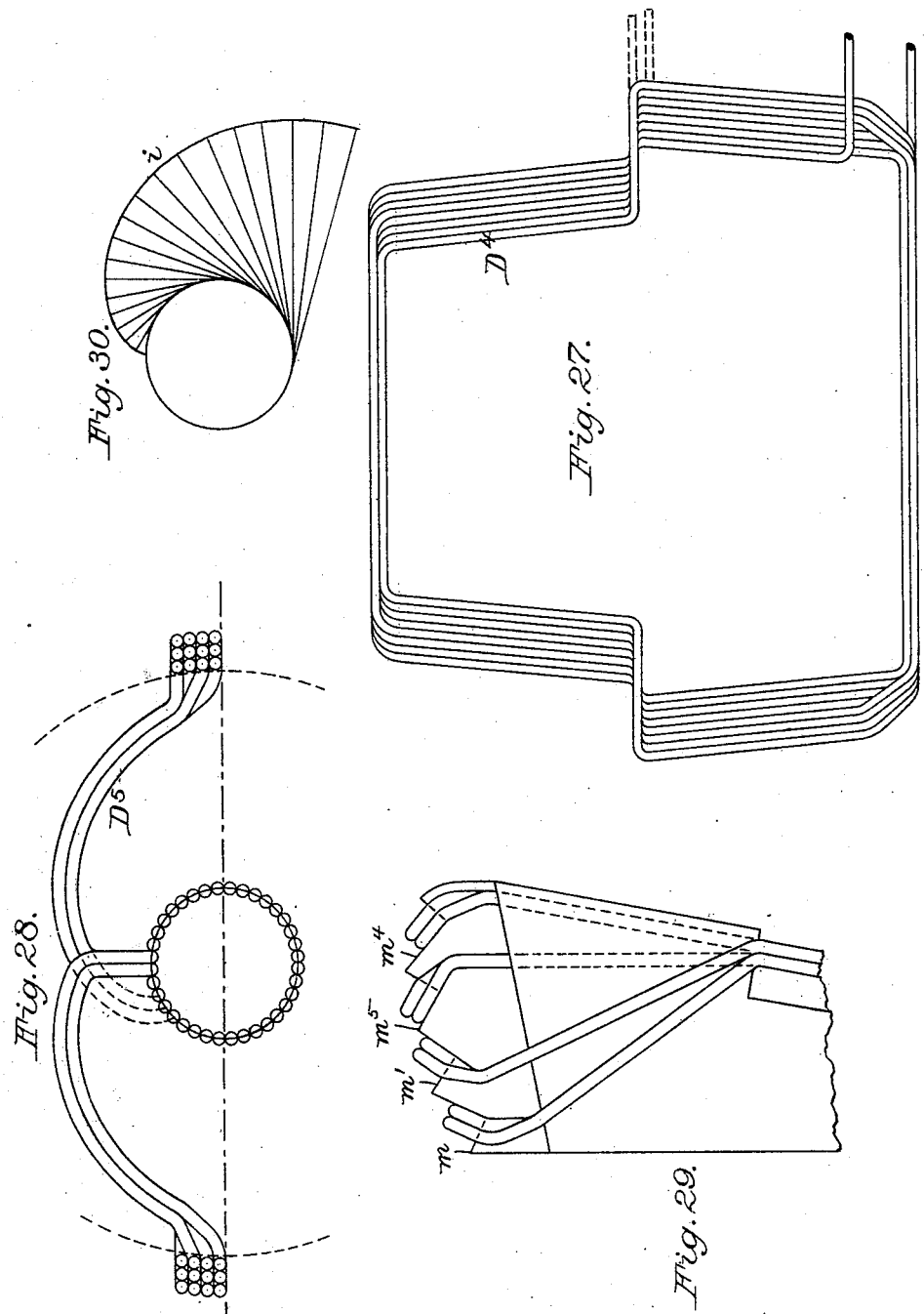

UNITED STATES PATENT OFFICE.

RUDOLF EICKEMEYER, OF YONKERS, NEW YORK.

DYNAMO-ELECTRIC MACHINE.

SPECIFICATION forming part of Letters Patent No. 377,996, dated February 14, 1888.

Application filed May 11, 1887. Serial No. 237,862. (No model.)

*To all whom it may concern:*

Be it known that I, RUDOLF EICKEMEYER, of Yonkers, in the county of Westchester and State of New York, have invented certain new and useful Improvements in Dynamo-Electric Machines; and I do hereby declare that the following specification, taken in connection with the drawings furnished and forming a part thereof, is a clear, true, and complete description of the several features of my invention.

My said improvements pertain to the "winding" of armatures, and they are applicable to many of the various forms of dynamo-electric machines, whether for generating electricity or for use as motors, and especially to such as contain an armature having a winding of wire, as distinguished from what are known as "bar-armatures."

Heretofore at the ends of the wire-wound armatures the wire in the coils has crossed, or has been crossed by and in close contact with, the insulated wire of other coils, and sometimes portions of wire in one coil have crossed other portions of the wire in the same coil, as a result of which perfect insulation is rendered extremely difficult.

One object of my invention is to reduce the crossing of wire in each coil at the ends of the armatures to a minimum, and to avoid close contacts wherever the path of any portion of the wire is angular to the path of any other portion, whether said portions of wire be in one coil or in several coils.

Heretofore in all bipolar machines and in many multipolar machines having armatures embodying a series of wire coils or windings crossing the ends of the armature drum or core the wire included in some of the coils or circuits has necessarily been greater or lesser in length than that in some other coils, and hence said coils have varied in resistance; and another object of my invention is to provide an armature with coils which contain a uniform length or quantity of wire, thus securing a practically uniform resistance in the several circuits and obtaining a practically perfect equilibrium throughout the armature-conductors.

Another object of my invention is to enable all of the conductor coils or windings to be readily removed from the armature and to keep each practically intact for ready replacement thereon, and thus to provide not only for the substitution of a new coil for an imperfect one, but also to economize in wire and reduce the cost of applying windings to armatures.

In certain prior multipolar machines the armature-coils have been capable of ready attachment to and removal from the armature drum or core, and several of the coils in each armature have been counterparts in size and form, but several different sizes and forms have been necessary in each machine; but I know of no prior multipolar or bipolar machines in which the several armature coils were counterparts in size and form, or any prior bipolar machine which has had coils capable of being applied to or removed from the drum or core without actually unwinding the wire, although in certain prior machines having bar-conductors the bars could be readily applied to and detached from the drum or core by separating the bars from such disks or other radial conductors as were employed at the ends of the drum or core as distinguished from one of my independent and separable coils, which can be removed complete and intact without materially varying its form or any liability of impairing the insulating jacketing on the wire.

Regardless of the character of the armature with reference to its polar arrangement I believe it to be broadly new to cover a drum or core with a series of coils which are counterparts in size and contour, and which are therefore interchangeable one with another with reference to their positions on the armature drum or core.

My present improvements involve a novel method of winding armature-conductors, and also the use of novel means devised by me, and, although these will be hereinafter described as aids to a proper understanding of the main features of my present invention, appropriate claims will be made thereto in a separate application for Letters Patent. Under my said novel method of winding drums or cores, I first form the wire into separate coils or "windings," which are counterparts in size and contour, then apply said coils to a drum or core, with appropriate portions of each coil loosely overlying appropriate portions of the periphery of the core parallel with its axis, and then, after all have been properly arranged with reference to each other, they are bound down and more or less contracted for securing a proper engagement of the winding with the periphery of the core.

In order that the wire of the several coils may be properly massed within a minimum of space at the ends of the armature, the end portions of the coils are curved in evolute lines.

In order that the crossing of the wire in each coil may be obviated, the wire at each end in each convolution is curved in evolute lines at both sides of what may be termed the "axial line" of the coil, and at the center or inner ends of said evolute curves or bends the wire is offset and occupies lines which are parallel with the axis of the coil, thus making one side of the coil longer than the other side, so that the short side of any one coil may be passed into and through the long sides of other coils, and enabling the wire at the ends of any one coil or winding on an armature to be practically isolated by space from the coincident underlying or overlying wire of any other adjacent coil, so that although the paths of the wires in such two adjacent coils are angular to each other, and in one sense cross each other, each will be insulated by more or less space from the other in excess of the insulating effect afforded by the usual insulating jackets or coatings on the wire.

Whether my coils or windings are adapted for use in bipolar or in multipolar machines, they are novel in that each at one side of what may be termed its "axial line" is of lesser external dimensions than the internal dimensions of its opposite portion, and both of said portions are substantially alike in contour, so that they can be symmetrically assembled upon a drum or core, and enable at the ends of said core one portion of each coil to overlie and the other portion to underlie appropriate portions of other coils.

The novel means devised by me for conveniently winding my novel coils consists of a "former" affording desirable outlines, and having detachable bearing or forming faces for enabling the removal of a coil from the former.

To more particularly describe my invention I will refer to the accompanying six sheets of drawings, and after describing in detail the several figures thereof the features deemed novel and properly within the scope of this application will be duly specified in the several clauses of claim hereunto annexed.

Figure 4:
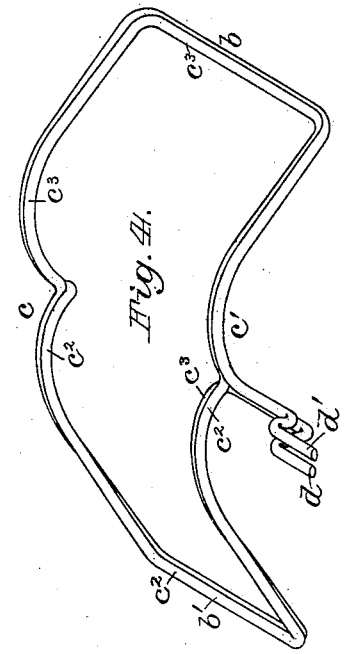
Figure 2:
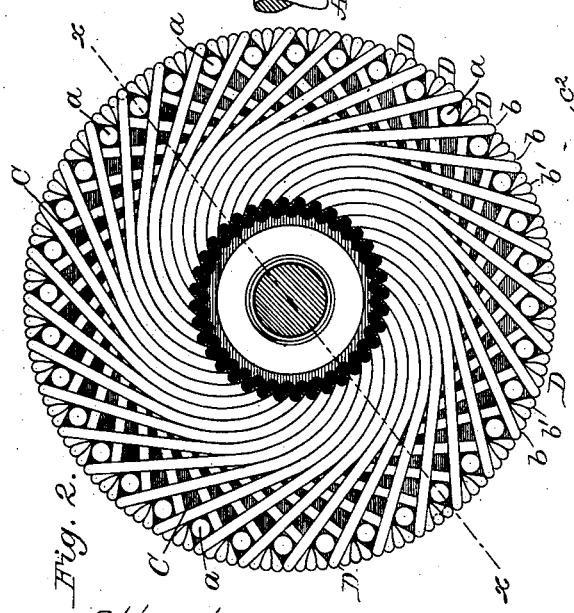
Figure 3:
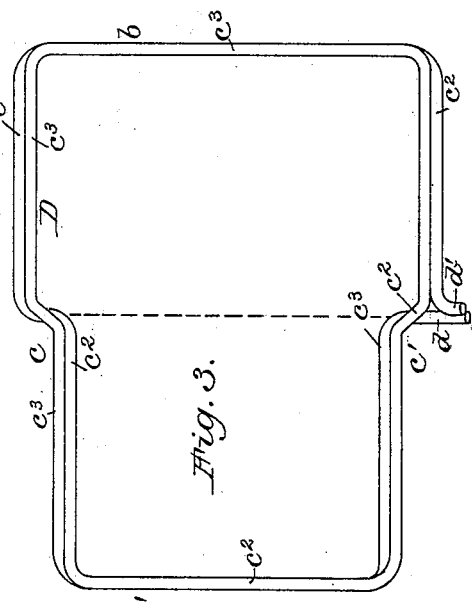

Referring to the drawings, Figure 1, Sheet 1, illustrates in side view a bipolar armature provided with thirty-six conducting-coils or windings in accordance with my invention. Fig. 2 is an end view of the same with the commutator removed. Fig. 3, in plan or top view, illustrates one of the coils or windings detached, but with a portion of its terminals removed. Fig. 4 is a perspective view of the same complete. Fig. 5, Sheet 2, in side view, illustrates an armature provided with my novel coils or windings in a more complex form and adapted for use in a four-pole machine. Fig. 6 is an end view of the same without the commutator. Figs. 7 and 8 respectively, in plan and side view, illustrate one of the coils detached. Fig. 9 illustrates one of said coils in perspective. Fig. 10, Sheet 3, illustrates portions of two coils for a bipolar armature-core, each coil having four convolutions or windings, and each located on a line which bisects the center of the core, the periphery of the latter being indicated in dotted lines. Fig. 11 is a top view of one end of said coils, Fig. 10. Fig. 12 illustrates portions of two coils of another form properly located with reference to each other as when on a core, and although each has four convolutions or windings, as in Fig. 10, in this case both coils are bisected by the aforesaid central line, as clearly indicated in this figure. Fig. 13 is a top view of one end of either of said coils in Fig. 12. Fig. 14 in like manner illustrates portions of two coils of still another form, each having eight convolutions or windings; but they are arranged on a core with reference to said central line, as in Fig. 12. Fig. 15 illustrates either of said coils of Fig. 14 in top view. Fig. 16, Sheet 4, illustrates one of my novel coil-winding "formers" in top view. Figs. 17 and 18 illustrate the two ends thereof. Fig. 19 is a side view thereof. Fig. 20 is an end view of a coil in the form developed by winding the wire upon said former. Fig. 21 is a side view of one end of said coil. Figs. 22 to 25, inclusive, Sheet 5, illustrate another variety of my former, and respectively showing its top, two ends, and one side. Fig. 26 is an end view of a coil in the form developed upon the former, Fig. 22. Fig. 27 is a top view of such a coil as would be produced on the former, Fig. 22; but in this case the terminals are located near one side of the coil instead of being near the center, as in the other coils; but with this form of coil said terminals may, if desired, be located at the center, as in the other coils. Fig. 28 illustrates one of my coils having twelve convolutions or windings, differing in the arrangement of the wire at the sides of the coil. Fig. 29 illustrates, in side view, a former on which the coil, Fig. 28, is wound, but which when removed therefrom is then bent into the form indicated. Fig. 30 illustrates the evolute line, which is required for bending a coil like Fig. 28, so that all the wires at the ends of the armature will be equidistant from each other throughout their curved paths.

In my above descriptions of the several figures it will be seen that I have applied the term "side" to that portion of a winding or coil of conducting-wire which traverses the face of an armature-core, and the term "end" to that portion of the coil which lies across the end of an armature in passing from one portion of the face of an armature drum or core to another portion, as in multipolar machines, or to the diametrically-opposite side of said face, as in some bipolar machines, and I shall deem the axis of the coil that line which corresponds with the axis of the armature-core on which said coil is used, whether said coil-axes be located quite closely to the axis of a drum or core, as in bipolar machines, or more remote from the armature-axis, as in multipolar machines.

In Fig. 1 the armature-shaft A and commutator B require no special description, and the same is true of the armature drum or core C, which is hidden from view in Fig. 1, but more or less exposed at its ends in Fig. 2, and projecting laterally from said ends there is a series of annularly-arranged detachable studs or pins, $a$, composed of or covered with insulating material. In this armature there are thirty-six counterpart coils D, of conducting-wire, and each coil at one side of its axial line (indicated in dotted lines in Fig. 3) is of lesser external dimensions than the internal dimensions of the opposite portion, and both of said portions are substantially alike in contour, and this characteristic feature is always maintained by me regardless of the number of windings in the coil and of variations in the form of the armature to be covered.

In Figs. 3 and 4, $b$ $b'$ denote the two sides, and $c$ $c'$ the two ends, of the coil, $c^2$ $c^3$ the convolutions, and $d$ and $d'$ the terminals, which are electrically connected with the commutator B. The side $b$ of the coil is longer than the side $b'$, so that when the several coils are mounted on the core the side $b'$ of each passes into or through the sides $b$ of other coils, the narrow short sides alternating with the protruding long sides, and the pins $a$ serving to confine them against peripheral displacement on the core. It will be seen that at each end of the coil the path of the wire in each convolution is in a peculiarly curved or evolute line extending from the side of the coil to a point near the center, (but at one side of the axis thereof,) then in a line as nearly parallel with the axis of the coil as may be practicable, then in another evolute line to the opposite side of the coil. It will also be seen that while the wire in both convolutions of each coil lies side by side upon the armature-face in one layer, said wire at the ends of the coils is changed in position, so that the wires of the two convolutions stand side by side, but at right angles to the ends of the core. The wire of which these counterpart windings or coils are usually composed is sufficiently flexible to enable the sides to be readily pressed into close contact with the face of the core, and also so that in putting a series of such coils upon an armature the long sides of the coils may be lifted to allow the short sides of other coils to be passed freely beneath them, or, on the other hand, to allow the long sides to pass freely over the short sides of other coils. In this armature it will also be seen that the two sides of each coil occupy upon the face of the core positions on the same side of a central diametric line, as illustrated at line $x$, Fig. 2, it being understood that said line passes at one side between the short side of one coil and the long side of the next adjacent coil, and at the opposite side of the core it passes between the long and short sides of the same two coils.

It will also be seen that all parts of the wire in either convolution are substantially parallel with the coincident parts of the other convolution in the same coil, and that although at the ends of the coils the path of wire in every coil is angular to the path of wire in other coils outside of it, they are so far separated or isolated from each other by space as to secure perfect insulation. It will be obvious that all of the coils can readily be loosely applied to the core, the pins $a$ placed in position, and the sides of the coils pressed into proper relations with the periphery of the core without any material derangement of the wire at the ends of the coils.

In Figs. 5 and 6 I show an armature having thirty-six coils, each containing four convolutions and arranged so that the wire is in two layers on the core.

The coils D', as before described, have long sides $b$, short sides $b'$, and terminals $d$ and $d'$; but each coil has four convolutions, $c^2$ $c^3$ $c^4$ $c^5$, as best illustrated in Fig. 7. This being an armature for a four-pole machine, each of the coils extends over one-quarter of the periphery of the armature, as indicated by the two lines $x$, which divide the periphery into four equal parts.

The detachable studs $a$ are applied, as before, for confining the coils in place and enabling the wire in the several convolutions at the ends of the coils to be maintained side by side or four wide, instead of two wide and two deep, as at the sides of the coils. Near the center another series of detachable pins or studs, $a'$, is employed for better confining the coils in place. These pins are inserted after the proper number of coils have been loosely applied to a drum or core.

The path of each convolution of wire is substantially as described in connection with Fig. 3, and at no point does any one part of the wire cross another part, the paths being as nearly parallel at all points as it is practicable to have them; and, although the paths of the inner grouped portions of the convolutions at the ends of the coils are angular to the paths of the outer or protruding groups, they are isolated therefrom, or separated by ample space, to serve a good purpose in the matter of insulation. After the coils are properly mounted upon the cores the usual peripheral binders are applied, as indicated in dotted lines in Figs. 1 and 5. Each of these drum-armatures contains, as I believe, for the first time, a winding of wire, in which all the coils are counterparts in size and contour, are of equal length, and the several circuits or sections are uniform in resistance and inductive effects, and also in which the sides of the several convolutions of each coil lie parallel with the axis of the armature, and the connecting or end portions thereof lie side by side in a flattened group and parallel with each other; also, in which portions of each section or coil at its ends lie in contact with the ends of the armature-core, and other portions of its ends offset at its axial line and free from contact with the ends of said core.

In the armature, Figs. 5 and 6, I also for the first time, as I believe, disclose a winding composed of a series of detachable counterpart coils, in which one-half of each winding at one side lies next to the periphery of the drum or core, and at the other side lies upon an interposed winding.

In Figs. 10 and 11 the coils D' are illustrated, each having four convolutions, $c^2$ $c^3$ $c^4$ $c^5$, and these are arranged as before described; and it will be seen that the convolution $c^3$, for instance, at the right-hand side of the figure, is the lower outer layer, while on the other side it is the upper inner layer, and so on. These coils are shown as when arranged for bipolar machines, and the wire at the ends is grouped side by side, four wide, and stands at right angles to the ends of the core. It is sometimes desirable that the wire at the sides of each coil should be in one layer, superimposed by the wires of another coil, to form additional layers, as illustrated in the coils $D^2$ of Figs. 12 and 13, in which case each coil has four convolutions, $c^2$, $c^3$, $c^4$, and $c^5$, and the wires thereof lie side by side on the face of the armature-core, and also side by side at the ends, but at right angles to the ends of the drum or core, as clearly indicated in Fig. 13, which is a top view of one end, $c$, and portions of two sides, $b$ and $b'$, of a coil. These coils have the same general characteristics of those previously described; but it will be seen that at each side of the core (indicated in dotted lines) each coil at its one side overlaps or overlies one side of another coil, and that at the opposite side this overlapping is reversed, thus placing all of the convolutions in both coils in a uniform position on the armature-drum or core. This general arrangement can be carried out to any possibly desired extent—as, for instance, so as to cover an armature core with four layers of conducting-wire, as illustrated in Figs. 14 and 15, wherein each coil $D^3$ has eight convolutions, the wire at the sides $b$ or $b'$ of each coil being in two layers and four wide, and one side of each overlying one side of the other, and on the other side of the core (indicated in dotted lines) the overlying of the sides is reversed, as before described; and in this coil the wires at the ends stand side by side in one web or layer, eight wide, as shown in Fig. 15, and at right angles to the ends of a drum or core when applied thereto.

For enabling my invention to be thoroughly understood I will next proceed to describe the devices which I have invented and the novel mode of winding employed in the production of my novel armature-coils.

In Figs. 16, 17, 18, and 19 I show one of my formers, upon which the wire is wound. This former consists, in part, of a strong rectangular frame having sides $e$ $e'$ and ends $e^2$ $e^3$, the size and proportions of said frame and its parts being varied, according to the size and character of the armatures with which the coils are to be used. At each side of the frame there is a central transverse open vertical slot, $f$ $f'$, curved at the bottom and provided with side walls, $f^2$ $f^3$, laterally projecting, respectively, from the outer surface of one side and the inner surface of the other. These slots should be of a width to correspond with the size of the wire used in each case. These side walls, $f^2$ $f^3$, may be fixed in position; but it is preferable that they be detachable, and hence they are parts of detachable cheek-pieces. There are four cheek-pieces, $g$ $g'$ $h$ $h'$, which in matters of substance are counterparts, each having an evolute forming-face, $i$, on its lower side, and each being detachably applied to the frame by means of dowel-pins and thumb-bolts $k$. Two of said cheek-pieces, $g$ and $h$, are applied to the inner surfaces of the sides of said frame at one side of said slots $f$ $f'$, and at the opposite side the cheek-pieces $g'$ and $h'$ are similarly applied to the outer surfaces of the sides of the frame. At the top of one end, $e^2$, of the frame there is a single vertical forming-face, $l$, having rounded ends and extending from one side of the frame to the other, and there are two small vertical slots, $l'$, which enable the convenient use of twine for binding the convolutions at the end of a coil together. At the opposite end, $e^3$, of the frame there are two similar forming-faces, $m$ and $m'$, occupying different vertical and horizontal planes, and the upper face, $m'$, is shorter than the lower face, and the latter is slightly inclined inwardly to form the wires in proper shape to be laid against the inner wires in parallel lines. All of said forming-faces have at their bases horizontal ledges or surfaces.

In winding I first arrange a straight length of wire (equal to a little more than one-half of a convolution of the coil desired) so that it will project from the outer end of the cheek-piece $h'$ over and beyond the adjacent end portion of the frame, and then I commence to lay the wire beneath said cheek-piece $h'$, thence through the slot $f'$, beneath the cheek-piece $h$, thence up and along the straight bearing-face $m$, beneath the cheek-piece $g$, outward through the slot $f$, beneath cheek-piece $g'$, along the straight bearing-face $l$, beneath cheek-piece $h'$, alongside of the wire already laid, and so on until the desired number of convolutions have been wound, the end projecting through slot $f$ serving as one terminal. Then the initial end is carried along the bearing-face $l$ beneath the cheek-piece $g'$, and opposite the slot $f$ it is bent outward to serve as the second terminal of the coil or circuit. With the bearing-faces $l$ and $m$ a coil like coil D, Fig. 3, would be produced. With the bearing-faces $l$, $m$, and $m'$ a coil like those shown in Figs. 10 and 11 would be produced. With a single bearing-face at $m$ of proper height coils $D^2$, Figs. 12 and 13, would be produced, and the two faces $m$ and $m'$ would also be used for winding coils $D^3$, Figs. 14 and 15, a part of a similar coil being shown in Fig. 20, from which it will be obvious that the coil having been thus wound upon the former requires only that the two groups of four convolutions each at the short side $b'$ of the coil are to be manipulated so that one group will overlie the other, and thus arrange the wire in four lines, two wires wide and two deep, as illustrated in Fig. 21, wherein the grouped wire at $b$, wound on the face $l$, is complete, and the two portions of wire at $b'$, wound on the faces $m$ and $m'$, are shown to be still separated but readily arranged, as described, so as to make them conform in arrangement with the wire at $b$.

The former shown in Figs. 22 to 25, inclusive, embodies all of the essential features already described in connection with the former, Fig. 16; but this differs from that in having angular sides, as clearly indicated, and in having bearing-faces $l^2\ m^2\ m^3$ of somewhat different form for winding such a coil as is illustrated in Fig. 26, having its terminals $d$ and $d'$ at the side $b$ of the coil, as also illustrated in Fig. 27 in the coil $D^4$. This former has also wire-receiving slots $f^2\ f^3\ f^4\ f^5$. This former has also a longitudinal bar, $n$, at the bottom provided with a central hole, $n'$, for enabling me to support the former upon a shaft or axis, so that it may be revolved in the process of winding, and similar variations can, however, be made in the previously-described former, if desired. After the coils have been removed from the former and properly manipulated and bound with twine at intervals, they are heavily charged with shellac or other suitable insulating material.

In Fig. 28 I illustrate a coil having twelve convolutions, arranged three deep and four wide at its sides. This coil can be wound upon a frame which has no curved faces; but the straight bearing-faces are detachable, as illustrated in Fig. 29. In this case the wire is laid side by side at the ends, forming webs six wires wide; but it is laid on each of the bearing-faces $m\ m'\ m^5\ m^4$ in three layers, two wires wide. After the coiling has been completed the bearing-faces are dropped away from the wire, and the coil is detached from the frame in the form indicated in said Fig. 29. The portions of wire from the faces $m$ and $m'$ are then pressed closely together, and so, also, are the portions from the faces $m^4$ and $m^5$, and then the two halves of the coil are bent at the ends, as indicated in solid lines in Fig. 28, thus completing the form of the coil, which, like all the others, at one side of its axial line is of lesser external dimensions than the internal dimensions of the opposite portion. The dotted lines in Fig. 28, near the middle of the coil, together with the solid lines, indicate the curve best suited for this coil.

In all the coils shown the wire at the ends occupies evolute lines, and I prefer that curve to any other, because it enables the shortest possible length of wire to be laid closely together. The circle upon which this curve is constructed should in each case have a diameter equal to the diameter of a circle, which at its periphery would coincide with the diameters of the wire in each web if said webs were grouped closely side by side, as indicated in Fig. 28. It will be observed that in the bipolar armature, Fig. 2, the wire is curved for more than half its length at the ends, while in the four-pole armature, Fig. 6, a much smaller length of wire is curved, and this curving of the webs becomes of little importance if the number of poles be increased. In each coil, regardless of how the wire of the several convolutions at the sides of the coil may be arranged for duty in a magnetic field, the wire is uniformly arranged at the ends of the coil, in that it lies in two evolute paths joined by a central path parallel with the axial line of the coil, said axis corresponding with the axis of the armature of which the coil may form a part.

In each coil there is a long side, $b$, and a short side, $b'$, and in each case the short side can be passed into or through the long side, because for the first time a portion of each coil which is at one side of its axial line is of lesser external dimensions than the internal dimensions of the opposite portion of the coil, although both portions are substantially alike in contour. Again, when any of said coils are mounted upon an armature-core the larger portions of the coils at their ends are remote from the ends of the smaller portions of other coils, and hence although the paths of the conductors in each coil lie angularly to and cross the conductors of other coils at the ends, they are for the first time, as I believe, so far separated by space, or, at least, free from close contact, as to render electric communication between them practically impossible.

In mounting my coils, as illustrated in Figs. 1 and 5, the larger portions of the coils alternate with the smaller portions of the adjacent coils, and this feature is clearly involved with the use of the coils D, D', $D^4$, and $D^5$. With the coils $D^2$ and $D^3$ said alternation is also involved; but the small portions of the coils rest upon the face of the drum or core and the larger portions overlie the smaller portions.

It should be next observed that in each instance a set of any of the varieties of coil shown can be readily applied to an armature-core of proper diameter and length secured in proper relations to each other by the detachable pins or studs $a$, and as readily removed, without materially deranging the wire in any of the coils.

Each of these several novel features possesses value, and more or less of them may be employed upon an armature, and I am aware that variations in their employment can readily be made without materially affecting the results, as I believe will be clearly obvious to persons skilled in the art when guided by my disclosures, these latter being deemed by me ample for the purposes of this specification. It will be obvious that an armature drum or core may be provided with integral projections or recesses for holding the coils in place, and that such coils may also be used upon stationary cores for use in machines having revolving magnets.

Having thus described my invention, I herein claim as new and desire to secure by Letters Patent—

1. A dynamo electric armature coil or winding which at one side of what may be termed "its axial line" is of lesser external dimensions than the internal dimensions of the opposite portion, both of said portions being alike in contour, substantially as described.

2. In a dynamo-electric armature-winding, a series of coils which are counterparts in contour, each complete and separable from the others, and each having substantially one half thereof of lesser external dimensions than the internal dimensions of the other half, substantially as described, whereby portions of each of said coils overlie and other portions underlie appropriate portions of other coils.

3. In a dynamo electric armature-winding, a series of coils, each at one side of its axial line being of lesser external dimensions than the internal dimensions of the other half, and all mounted upon an armature drum or core with the smaller portions of the several coils alternating with the larger portions in their positions at the periphery of the drum or core, substantially as described.

4. In a dynamo-electric armature, a winding composed of detachable counterpart coils, each of which is placed in immediate contact with the periphery of the armature-core at one side only, substantially as described.

5. In a dynamo-electric armature, the combination, substantially as hereinbefore described, of an armature drum or core and a winding of wire in independent armature-coils which are of equal length and each of which occupies diametrically-opposite portions of the periphery of said drum or core.

6. In a dynamo-electric armature, a winding composed of independent separable coils of wire and in which the wire of the several convolutions lies upon the periphery of the armature drum or core in lines parallel with its axis and lies side by side in flattened webs edgewise to the ends of the core or drum and in parallel paths in crossing from one side or face of said core to the opposite side thereof.

7. In a dynamo-electric armature, an armature-coil inclosing a portion of the armature drum or core longitudinally and having at the ends of the coil and core portions lying in contact with said core and other portions of said coil at its ends offset adjacent to its axial line and removed from such contact, substantially as described.

8. A dynamo-electric armature-coil adapted to inclose an armature drum or core longitudinally and having the wire at its ends curved to occupy two evolute paths which merge at the center with a path which is parallel with the axial line of the coil, substantially as described.

RUDOLF EICKEMEYER.

Witnesses:
JOHN T. WARING,
JAMES S. FITCH.